US006857468B2

(12) United States Patent
Emrich

(10) Patent No.: US 6,857,468 B2
(45) Date of Patent: Feb. 22, 2005

(54) COOLER AND METHOD OF COOLING A MEDIUM

(75) Inventor: Karsten Emrich, Stuttgart (DE)

(73) Assignee: Behr GmbH & Co., Stuttgart (DE)

( * ) Notice: Subject to any disclaimer, the term of this patent is extended or adjusted under 35 U.S.C. 154(b) by 0 days.

(21) Appl. No.: 10/226,194

(22) Filed: Aug. 23, 2002

(65) Prior Publication Data
US 2003/0037917 A1 Feb. 27, 2003

(30) Foreign Application Priority Data
Aug. 24, 2001 (DE) ......................... 101 41 490

(51) Int. Cl.[7] ............................................. F28D 1/053
(52) U.S. Cl. ...................................... 165/125; 165/151
(58) Field of Search ................... 165/125, 916, 165/148, 149, 151

(56) References Cited

U.S. PATENT DOCUMENTS

| 2,067,758 A | * | 1/1937 | Flogaus .................... 180/68.1 |
| 2,423,175 A | * | 7/1947 | Churchill et al. ........... 165/159 |
| 2,895,313 A | * | 7/1959 | Flick ........................... 62/426 |
| 3,302,705 A | * | 2/1967 | Witten, Jr. .................. 165/176 |
| 3,866,668 A | * | 2/1975 | Doerner ....................... 165/92 |
| 4,056,143 A | * | 11/1977 | Martin ....................... 165/176 |
| 4,062,401 A | * | 12/1977 | Rudny et al. ............... 165/125 |
| 4,357,991 A |  | 11/1982 | Cameron |
| 4,377,203 A | * | 3/1983 | Ejima ......................... 165/125 |
| 4,423,767 A |  | 1/1984 | Hay, II et al. |
| 4,660,632 A |  | 4/1987 | Yampolsky et al. |
| 4,967,830 A | * | 11/1990 | Eubank et al. .............. 165/48.1 |
| 5,078,206 A | * | 1/1992 | Goetz, Jr. .................... 165/125 |
| 5,238,057 A |  | 8/1993 | Schelter et al. |
| 5,355,945 A |  | 10/1994 | Sanz et al. |
| 5,832,992 A |  | 11/1998 | Van Andel |
| 5,964,284 A | * | 10/1999 | Ikejima et al. .............. 165/171 |
| 6,085,832 A |  | 7/2000 | Rehberg |

FOREIGN PATENT DOCUMENTS

| DE | 27 18 966 A1 | 11/1977 |
| DE | 30 44 164 A1 | 9/1981 |
| DE | 38 28 011 C2 | 4/1990 |
| DE | 41 02 294 A1 | 8/1991 |
| DE | 195 10 847 A1 | 9/1996 |
| DE | 694 15 814 T2 | 5/1999 |
| DE | 696 10 589 T2 | 2/2001 |
| EP | 0 410 247 A2 | 1/1991 |
| EP | 0 581 644 A1 | 2/1994 |
| EP | 581644 A1 * | 2/1994 ............. F28D/7/16 |

* cited by examiner

Primary Examiner—Allen J. Flanigan
(74) Attorney, Agent, or Firm—Foley & Lardner LLP

(57) ABSTRACT

The invention relates to a cooler having means for directing a cooling medium, means for directing a medium to be cooled, and an essentially axially symmetrical housing. The means for directing the medium to be cooled is arranged in such a way that the medium to be cooled, in at least one first region, flows in an essentially axial direction, and the medium to be cooled, in at least one second region, flows in a direction having a radial component. The invention also relates to a method of cooling a medium and to various uses of a cooler according to the invention.

14 Claims, 13 Drawing Sheets

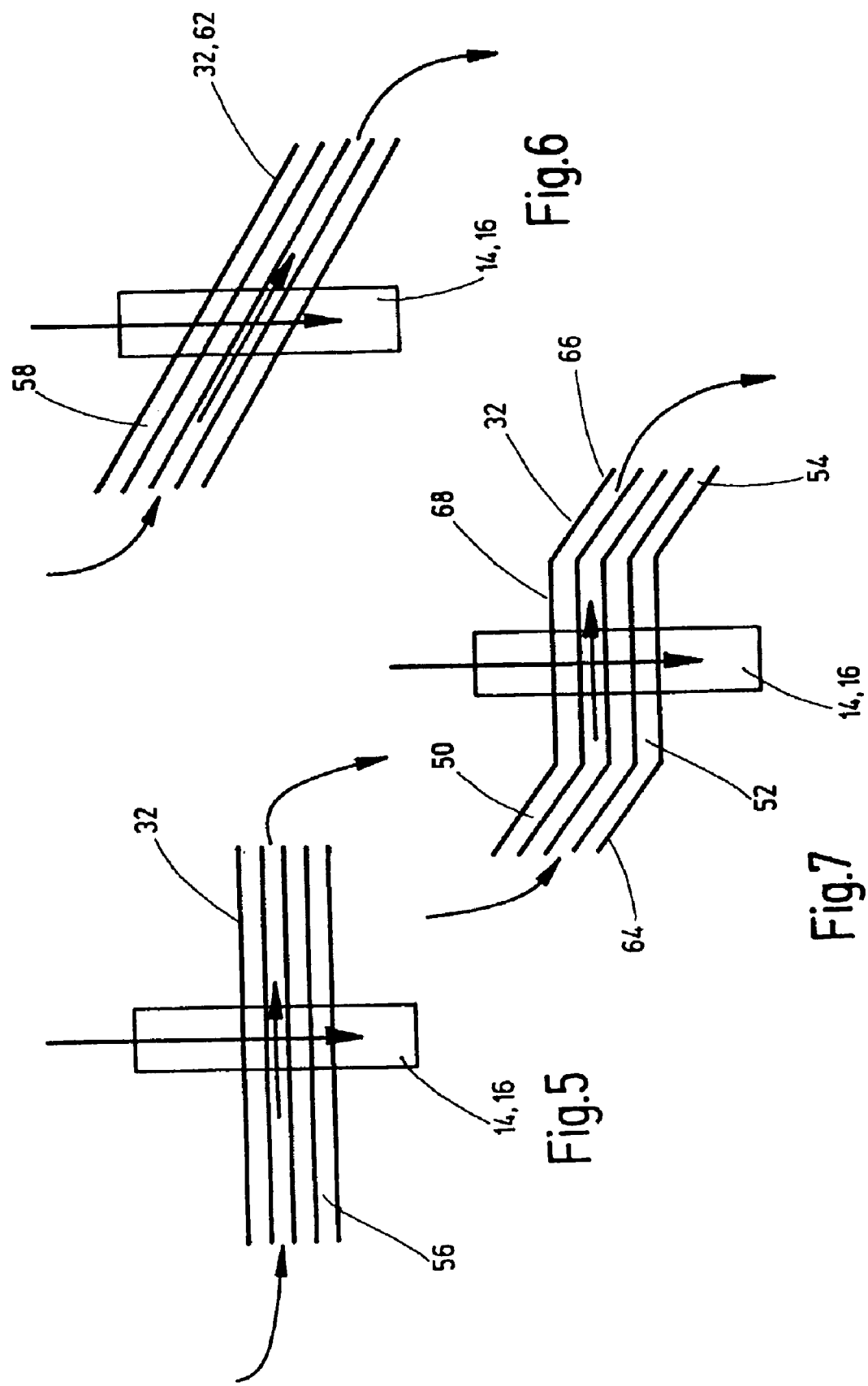

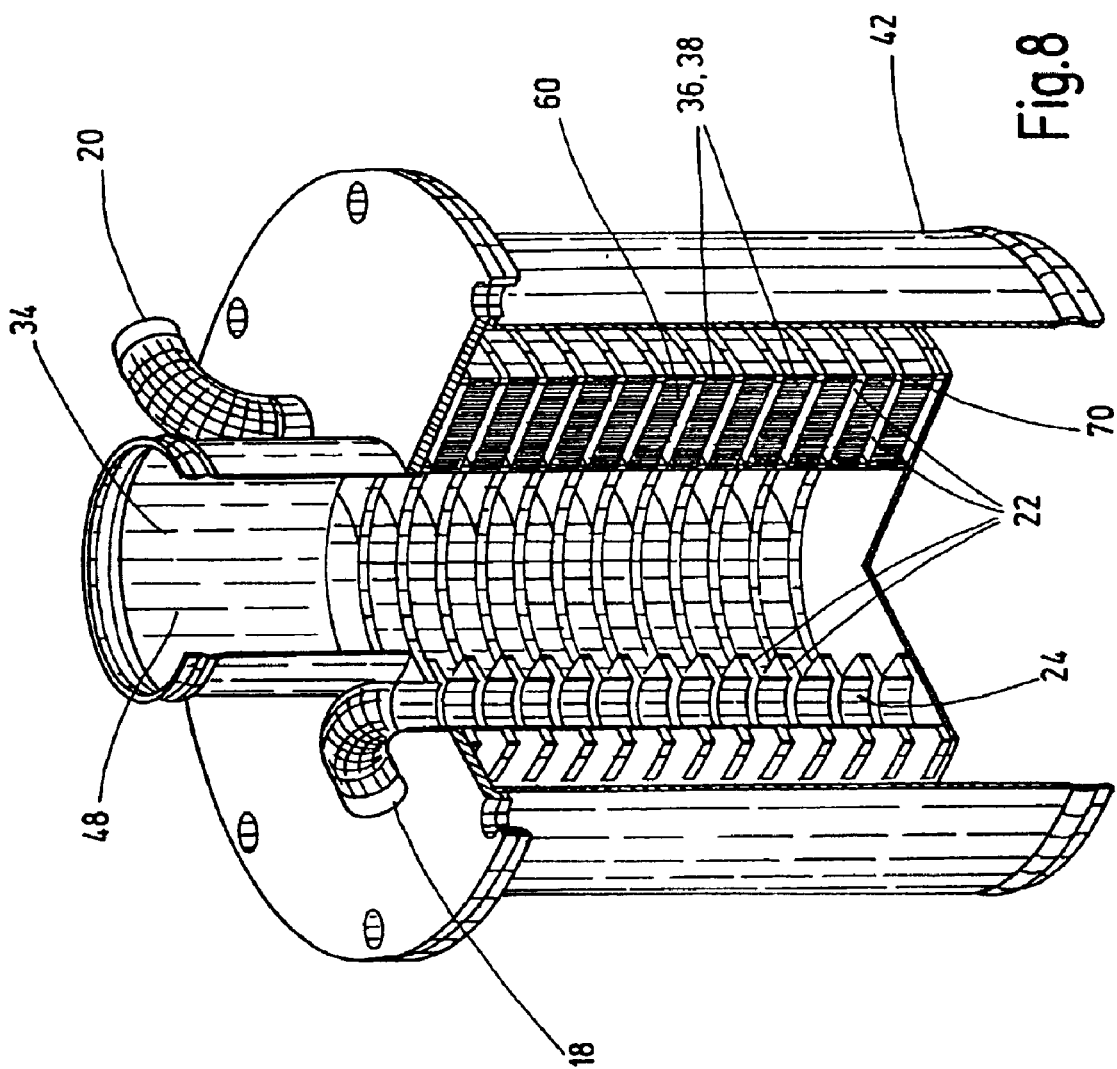

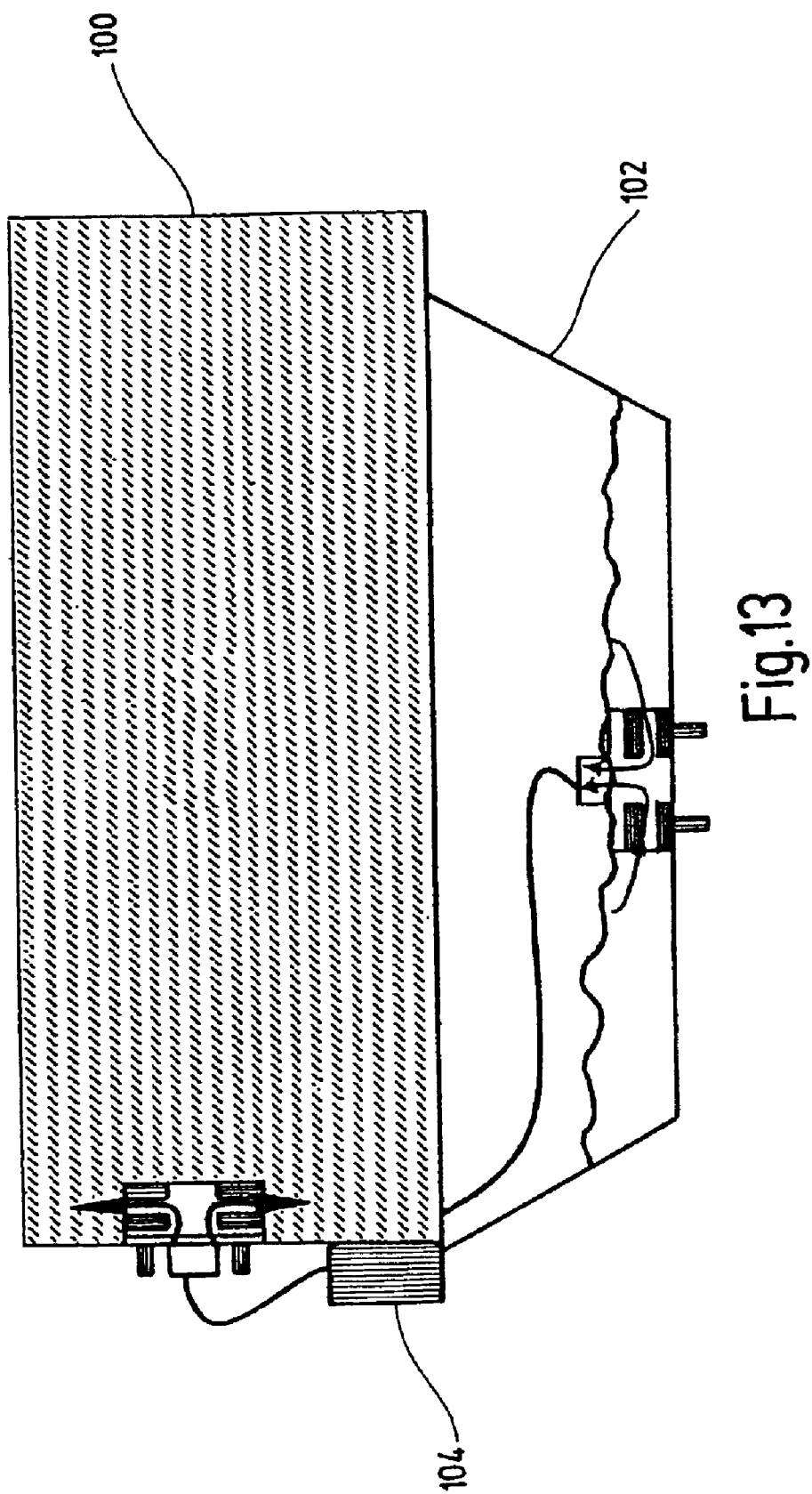

COOLER AND METHOD OF COOLING A MEDIUM

CROSS-REFERENCE TO RELATED PATENT APPLICATIONS

German Priority Application 101 41 490.0, filed Aug. 24, 2001, including the specification, drawings, claims and abstract, is incorporated herein by reference in its entirety.

BACKGROUND OF THE INVENTION

The invention relates to a cooler having means for directing a cooling medium, means for directing a medium to be cooled, and an essentially axially symmetrical housing. The invention also relates to a method of cooling a medium, in which a cooling medium and a medium to be cooled are directed in an essentially axially symmetrical housing.

Coolers of the generic type and methods of the generic type are used, for example, for the charge-air pre-cooling of an exhaust-gas turbocharger. Such charge-air coolers serve to cool the air compressed by the turbocharger before entry into the engine of a motor vehicle. There are a multiplicity of different embodiments of such coolers, which differ greatly with regard to numerous features. For example, cascade-shaped coolers are known, or also coolers having an axially symmetrical housing, the latter being designed, for example, as tube-nest coolers.

In the different embodiments, different problems occur, in particular in connection with the aim of increasing the cooling capacity. For example, if it is desired to increase the cooling capacity in a surface cooler, this can be achieved by enlarging the cooler perpendicularly to the flow direction of the medium to be cooled. However, the cooler thus requires an enlarged construction space, a factor which is a disadvantage in principle. In a round cooler, such as a tube-nest cooler, for example, the cooling capacity can be increased by the cooler being enlarged in the axial direction. A disadvantage with this solution, however, is that an increased pressure drop occurs inside the cooler.

SUMMARY OF THE INVENTION

One object of the present invention is to provide a cooler and a method of cooling a medium which avoid the above-described disadvantages of the prior art. A particular object is to avoid an increase in the pressure drop inside the cooler. A further object is to prevent adverse effects from occurring with regard to the construction space of the cooler.

In accomplishing these and other objects of the invention, there has been provided according to one aspect of the invention a cooler having a first passageway for directing a cooling medium, at least one second passageway for directing a medium to be cooled, and an essentially axially symmetrical housing, wherein the at least one second passageway for directing the medium to be cooled is arranged in such a way that the medium to be cooled, in at least one first region, flows in an essentially axial direction, and the medium to be cooled, in at least one second region, flows in a direction having a radial component.

In accordance with another aspect of the invention there has been provided a method of cooling a medium, in which a cooling medium and a medium to be cooled are directed in an essentially axially symmetrical housing, comprising:

directing the medium to be cooled, in at least one first region, in an essentially axial direction, and directing the medium to be cooled, in at least one second region, in a direction having a radial component.

Further objects, features and advantages of the present invention will become apparent from the detailed description of preferred embodiments that follows, when considered together with the appended figures of drawing.

BRIEF DESCRIPTION OF THE DRAWINGS

In the drawings:

FIG. 5 is a schematic representation for explaining a first arrangement of baffle plates/fin plates;

FIG. 6 is a schematic representation for explaining a second arrangement of baffle plates/fin plates;

FIG. 7 is a schematic representation for explaining a third arrangement of baffle plates;

FIG. 8 is perspective representation showing a partly cutaway third embodiment of a cooler according to the invention;

FIG. 13 is a schematic view showing a first example of use of coolers according to the invention;

DETAILED DESCRIPTION OF PREFERRED EMBODIMENTS

Figure 1:
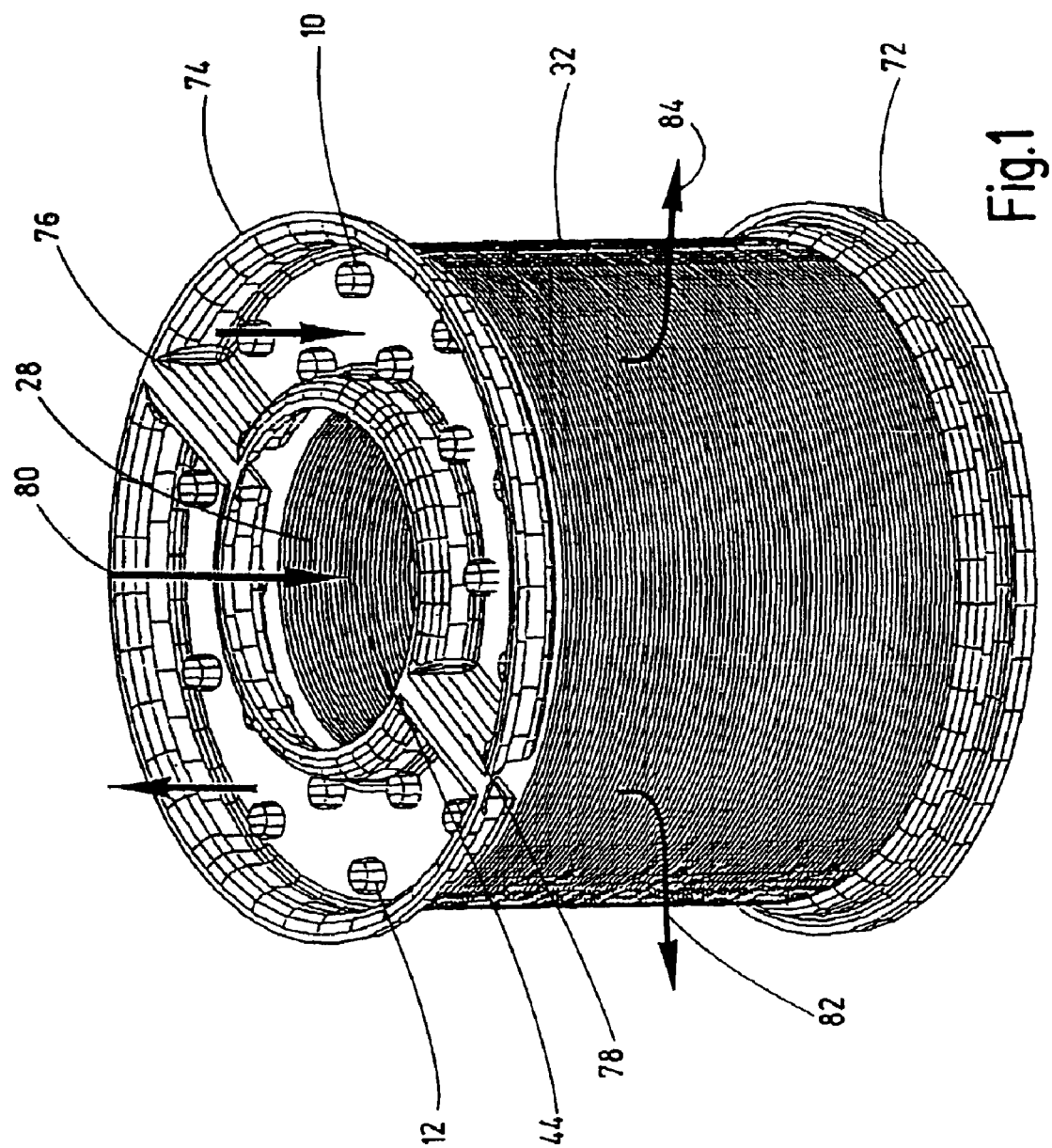
FIG. 1 is a perspective view showing a first embodiment of a cooler according to the invention.

According to the invention, the means for directing the medium to be cooled are arranged in such a way that the medium to be cooled, in at least one first region, flows in an essentially axial direction, and the medium to be cooled, in at least one second region, flows in a direction having a radial component. In such a cooler, an increase in the cooling capacity can be achieved by enlarging the cooler in the axial direction. When the cooler is used as a charge-air cooler, it is therefore merely necessary to replace some of the lines leading to the cooler in the axial direction, which are present anyway, by the enlargement of the cooler. Furthermore, however, with such an axial enlargement of the cooler, the undesirable increased pressure drop does not occur in the cooler. This is achieved by redirecting the flow inside the cooler, which ensures that the medium to be cooled does not have to flow around cooling surfaces over the entire length of the cooler, as is the case, for example, in a tube-nest cooler.

According to one preferred embodiment of the cooler according to the invention, the medium to be cooled, in a radially inner region, flows in an axial direction into the cooler, and the medium to be cooled flows out of the cooling region of the cooler in a direction having a radial component. The cooler may thus, at the same time, be advantageously used to connect together a pipe associated with a turbocharger and having a comparatively narrow diameter and another line at the inlet of the charge-air/air cooler, this line having a larger diameter. With the cooler, therefore, a cross-sectional transition is achieved in addition to its cooling effect.

Furthermore, in an especially advantageous embodiment, a multiplicity of essentially axially symmetrical baffle plates are arranged in layers one above the other, and the baffle plates have a radially inner aperture, so that a flow passage for the medium to be cooled is formed. In addition, a multiplicity of tubes are provided which run essentially in the axial direction, for directing the cooling medium, and pass through openings in the baffle plates. Also, there are flow paths between the baffle plates for the medium to be cooled, these flow paths having a radial component. Such a round-tube/disk type of construction withstands very high loads and can also be used where there is susceptibility to contamination. Due to the baffle plates, it is possible to carry out the inventive deflection of the medium to be cooled and to arrange this deflection in such a way that there is a low pressure drop.

In this connection, it is especially advantageous that the baffle plates are each designed like a conical envelope and enclose an angle of about 45° with the axis of the arrangement. Thus the air flowing in an axial direction is first of all deflected by about 45° when entering between the baffle plates and is deflected again by about 45° when discharging from the intermediate space between the baffle plates. This is a variant which is very advantageous from a fluidics point of view, since only two deflections of the medium to be cooled are required, which in addition only have to be effected by an angle of 45°.

However, it may also be useful for the baffle plates to each have a radially inner region which is designed like a conical envelope and a radially outer region which is designed like a conical envelope, and for there to be a region which runs essentially perpendicular to the axis of the arrangement and which has openings for the tubes to pass through. This last region is provided between the radially inner region and the radially outer region. In this way, it is likewise ensured that the air entering the cooler in the axial direction only has to be deflected by about 45° and that likewise only comparatively slight redirecting is necessary when the air discharges from the intermediate space between the baffle plates/fin plates. At the transition between the regions, such as a conical envelope and the radially running region, further deflections with corresponding angles are necessary. It may be useful to tolerate these further deflections, since the plates running perpendicularly to the axis of the arrangement in this region can be attached in a very much simpler manner to the tubes running in the axial direction and directing the cooling medium.

In a further especially advantageous embodiment of the present invention, provision may be made for a multiplicity of essentially axially symmetrical disks to be arranged in layers one above the other; for the disks to be arranged as disk pairs which form guides for the cooling medium, running in the circumferential direction; for the disks to have through-openings, so that an axial passage is formed through the disks arranged in layers one above the other; and for cooling fins to be arranged between the disk pairs, such that the medium to be cooled flows through these cooling fins essentially perpendicularly to the axis of the arrangement. Such a disk/fin/disk arrangement is especially advantageous on account of its simplicity from the production point of view.

In connection with the disk/fin/disk type of construction, it may be advantageous for the cooling fins to be corrugated fins placed on a radius. It is thus possible to ensure a radially directed flow of the medium to be cooled through the fins, so that ultimately the entire region available for the cooling is indeed utilized for the cooling.

However, it may also be useful for the cooling fins to be designed as fin plates having essentially parallel fin flanks. This certainly sometimes results in the disadvantage that the medium to be cooled does not flow around the entire region available for the cooling. On the other hand, however, an embodiment with fin plates is especially simple to produce, since fin plates and disks can be arranged in layers one above the other without problems.

The invention also comprehends a method wherein the medium to be cooled, in at least one first region, flows in an essentially axial direction, and wherein the medium to be cooled, in at least one second region, flows in a direction having a radial component. In this way, the advantages and features of the cooler according to the invention are also realized within the scope of a method. This also applies to the especially preferred embodiments of the method according to the specifically describe embodiments of the invention which are set forth below.

According to one preferred embodiment of the method according to the invention, the medium to be cooled, in a radially inner region, flows in an axial direction into the cooler, and the medium to be cooled flows out of a cooling region of the cooler in a direction having a radial component. In this way, the cross section of flow is changed.

Furthermore, according to another preferred aspect of the method according to the invention, the medium to be cooled is deflected from an essentially axial flow direction into a flow direction that forms an angle of about 45° with the axial flow direction. In this way, by only a comparatively small change in the direction of the flow, the effect that the medium to be cooled is transported radially outward is nonetheless achieved.

It is likewise advantageous in some instances for the medium to be cooled to be deflected from a flow direction which forms an angle of about 45° with the axial flow direction into a radial flow direction and to be subsequently deflected into a flow direction forms an angle of about 45° with the axial flow direction. Transport of the medium to be cooled radially outwardly is therefore likewise achieved. Four deflections are required, these being tolerated so that the cooling fins can be fastened in an intermediate region in a simple manner to tubes which direct the cooling medium.

In a further preferred embodiment, provision is made for the medium to be cooled to be deflected from an essentially axial flow direction into a radial flow direction. In this embodiment, two changes in the flow direction of 90° take place. These pronounced changes in direction can be tolerated, in particular with regard to the embodiment of the cooler in a disk/fin/disk type of construction.

Furthermore, the invention relates to the use of a cooler according to the invention as a charge-air pre-cooler.

Furthermore, the cooler according to the invention can advantageously be used as an exhaust-gas cooler.

It may likewise be useful to use the cooler according to the invention as an oil cooler.

Furthermore, it is useful to use the cooler according to the invention as a fuel cooler.

The invention is based on the principle that coolers which have a cross-sectional transition and can also be subjected to extreme loads can be made available. It is possible to realize the heat-exchange area by enlarging the cooler in the primary flow direction, while at the same time reducing the pressure drop. Within the scope of the invention, embodiments are possible which are distinguished by their especially simple construction, for example, the disk/fin/disk type of construction described. Other embodiments, in particular with regard to pressure loading and contamination, are especially robust, for example, the round-tube/disk type of construction described.

The invention will now be explained by way of example with reference to the attached drawings and preferred exemplary embodiments.

In the description below of the exemplary embodiments of the present invention, the same reference numerals designate the same or comparable components. For the explanation of the invention, it is assumed that the medium to be cooled is air. However, the comments also equally apply to other media to be cooled.

FIG. 1 shows a first embodiment of a cooler according to the invention in perspective representation. The cooler has a multiplicity of baffle plates 32 which are arranged in layers one above the other and expose an opening 44 in an inner region as means 28 for directing a medium to be cooled. The cooler is defined on the underside by a coolant box or tank 72. A tank 74 is provided on the top side. The interior of the top tank 74 is provided with two separating elements 76, 78. Cooling medium is directed into the right-hand part of the tank 74. Cooling medium is extracted from the left-hand part of the tank 74. From the right-hand part of the tank 74, the cooling medium passes into the openings 10 which continue in the axial direction through the cooler in the form of tubes. From tubes 12, which likewise continue in the axial direction through the cooler, the heated cooling medium passes into the left-hand part of the tank 74. The bottom tank 72 is designed in such a way that the cooling medium is delivered from the tubes 10 into said bottom tank 72, can spread there at random, that is to say there are no boundaries corresponding to the elements 76, 78 in the top tank 74, and can then flow upward through the tubes 12 into the top tank 74. The baffle plates 32 are designed in such a way that the air entering the cooler in the axial direction 80 discharges in radial directions 82, 84. The baffle plates/fin plates 32 of this embodiment may be formed in a similar manner to the baffle plates explained in connection with FIGS. 2, 3, 4, 5, 6 and 7.

Figure 2:
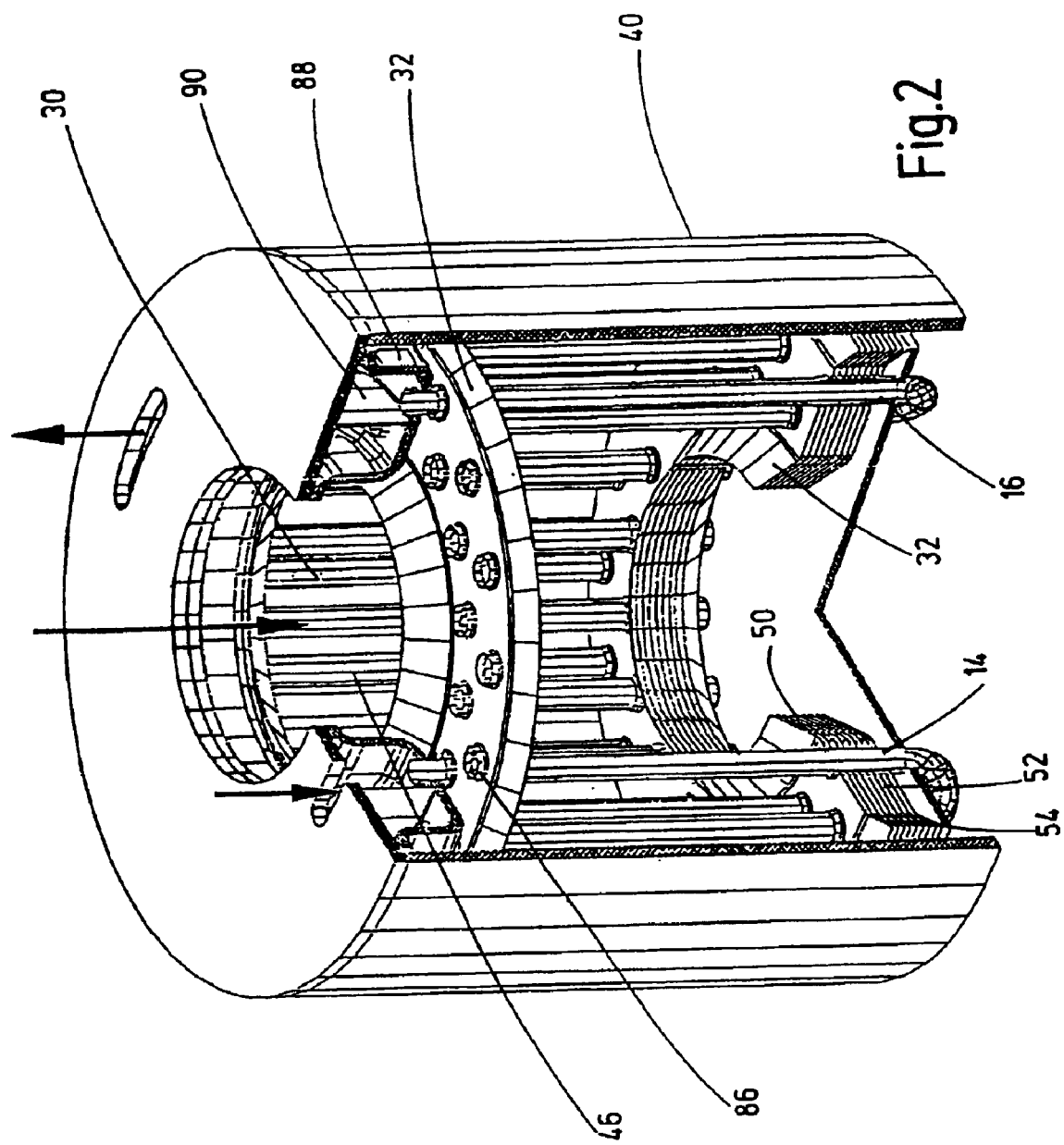
FIG. 2 is a perspective view showing a partly cutaway second embodiment of a cooler according to the invention.

FIG. 2 shows a partly cutaway second embodiment of a cooler according to the invention in perspective representation. The cooler according to FIG. 2 may be provided with baffle plates 32 over its entire inner axial length, although, for the sake of clarity, only some baffle plates 32 arranged in the bottom region and one baffle plate 32 arranged in the top region are shown in this case. The cooler is surrounded by a housing 40. Arranged in the top region of the housing is a tank 88 which has a partition 90 running in the circumferential direction. Cooling medium is directed into the radially inner part of the tank 88, and cooling medium is extracted from the radially outer part of the tank 88. The cooling medium directed into the tank passes through the tubes 14, which extend axially downward into the cooler, into the region of the baffle plates 32. The tubes 14 are curved in the bottom region, and they merge into the part of the tubes which is identified by the reference numeral 16, i.e., passing back upwardly through the baffle plates. These tubes 16 then open into the radially outer region of the tank 88, from which the cooling medium can be extracted again. This embodiment, in contrast to the embodiment according to FIG. 1, therefore does not need a bottom tank. However, curved tubes 14, 16 are required. The cooling plates 32 have a multiplicity of openings 86, through which the tubes 14, 16 can pass. Furthermore, the baffle (cooling) plates 32 expose a radially inner region 46, which serves as a means 30 for directing a cooling medium. From this region, the medium to be cooled is deflected radially through the regions 50, 52, 54 in directions having a radial component.

Figure 3:
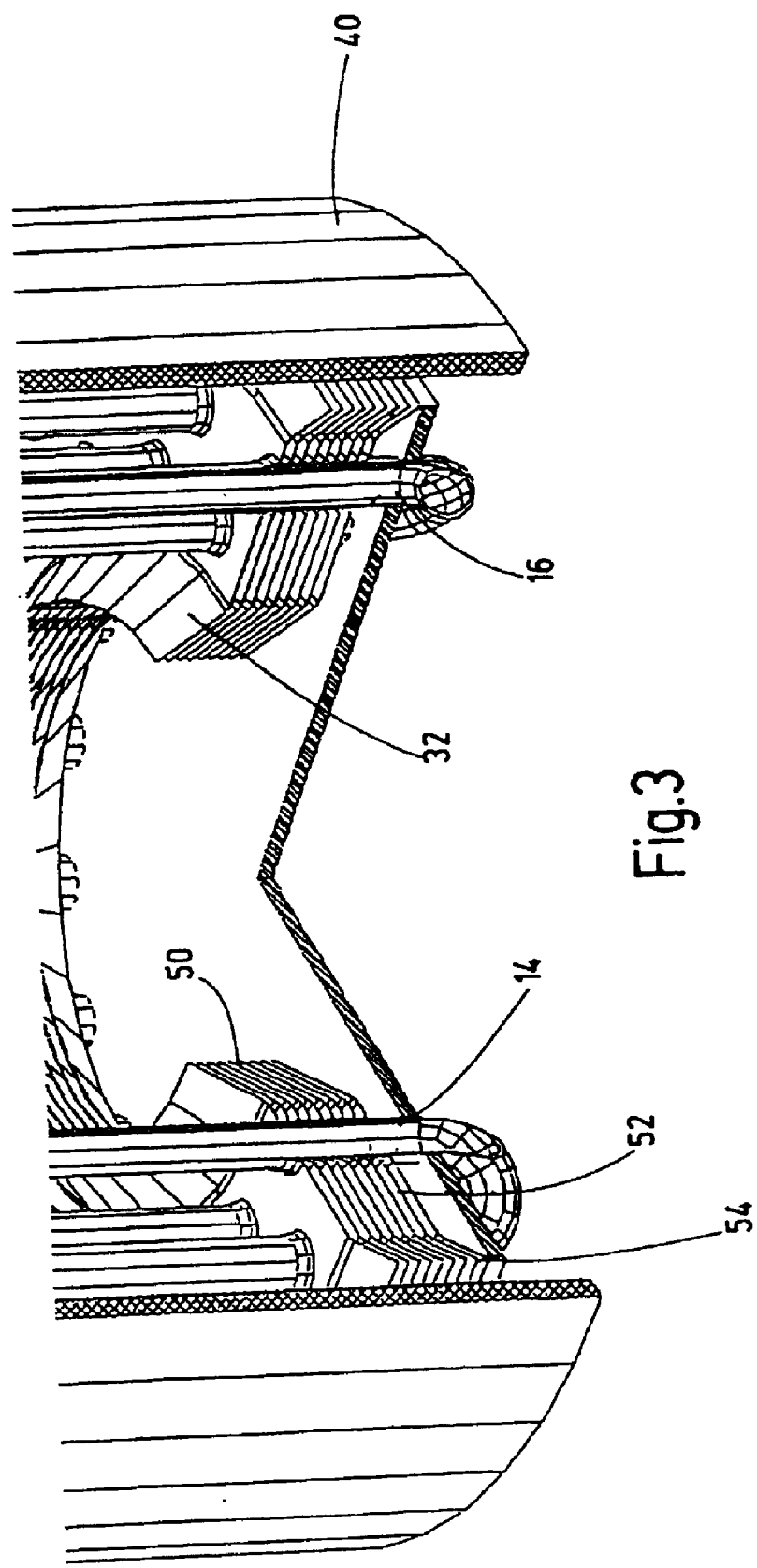
FIG. 3 shows an enlarged part of the cooler according to FIG. 2.

FIG. 3 shows an enlarged part of the cooler according to FIG. 2.

Figure 4:
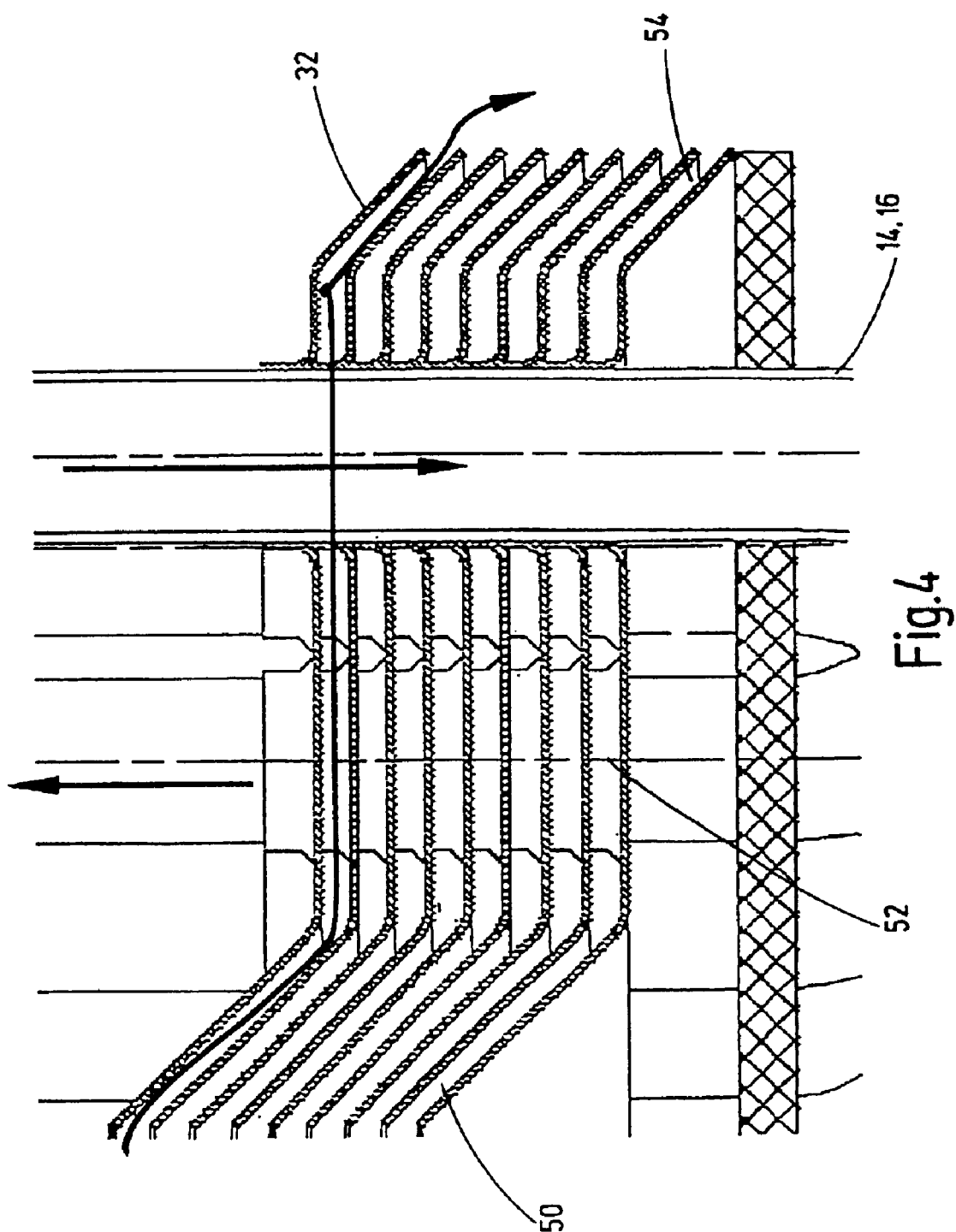
FIG. 4 is a cross-sectional view of part of the cooler according to FIGS. 2 and 3.

FIG. 4 shows a sectional view of part of the cooler according to FIGS. 2 and 3, the section being taken in the axial direction. The air entering the cooler in the axial direction is deflected into the regions 50 of the baffle plates 32, then passes into the radially extending region 52, for which purpose it is again deflected, then flows around the tube 14, 16 and is deflected once again in order to pass into the region 54 of the baffle plates 32. From there, the medium to be cooled then leaves the cooler in a cooled form. The baffle plates 32 are fastened or bonded to the tube 14, 16.

FIG. 5 shows a schematic representation for explaining a first arrangement of baffle plates. This embodiment is especially simple to produce, since only simple circular-disk-shaped baffle plates/fin plates 32 are used. However, this embodiment has the fluidic disadvantage of requiring two deflections of 90°, one into the flow path 56 and the other out of the flow path 56.

FIG. 6 shows a schematic representation for explaining a second arrangement of baffle plates. This embodiment is to be preferred from the fluidic point of view, since only two deflections by 45° through the baffle plates 32, designed like a conical envelope 62, into the flow paths 58 or out of the flow paths 58 take place. However, this embodiment is more complicated from the production point of view, for the fastening of the baffle plates 32 to the tubes 14, 16 is complicated on account of the angled position.

FIG. 7 shows a schematic representation for explaining a third arrangement of baffle plates. This embodiment constitutes a compromise between fluidic requirements and manufacture in the simplest possible manner. The baffle plates 32 each have a first region 64, a second region 66 and a third region 68. The first and the second region are each formed like a conical envelope. The region 68 lying between these regions 64, 66 is radially oriented. Thus flow paths having three regions 50, 52, 54 are obtained, so that four deflections are certainly required, but in each case only by 45°. On account of their perpendicular arrangement relative to the tubes 14, 16, the baffle plates 32 formed in this way can be fastened to the latter in a simple manner.

FIG. 8 shows a partly cutaway third embodiment of a cooler according to the invention in perspective representation. In this embodiment of a cooler according to the invention, a multiplicity of disks 70 are arranged inside a housing 42. One of these disks is shown individually in FIG. 10. Cooling liquid can be directed into the cooler through an opening 18. This cooling liquid then passes into a passage 24 which is formed by openings in the disks 70. The disks are arranged in such a way that passages 22 running in the circumferential direction are formed, which will be explained in more detail below with reference to FIG. 10. The cooling liquid directed into the passage 24 can thus be distributed in the circumferential direction through the passages 22 and can discharge again from the cooler through the opening 20. Cooling fins 36, 38 are arranged between the disks 70, which themselves are arranged in pairs in each case to form a closed passage. Air entering the opening 48, which serves as means 34 for directing the inflowing medium to be cooled, can therefore enter the regions 60 and flow radially outwardly.

Figure 9:
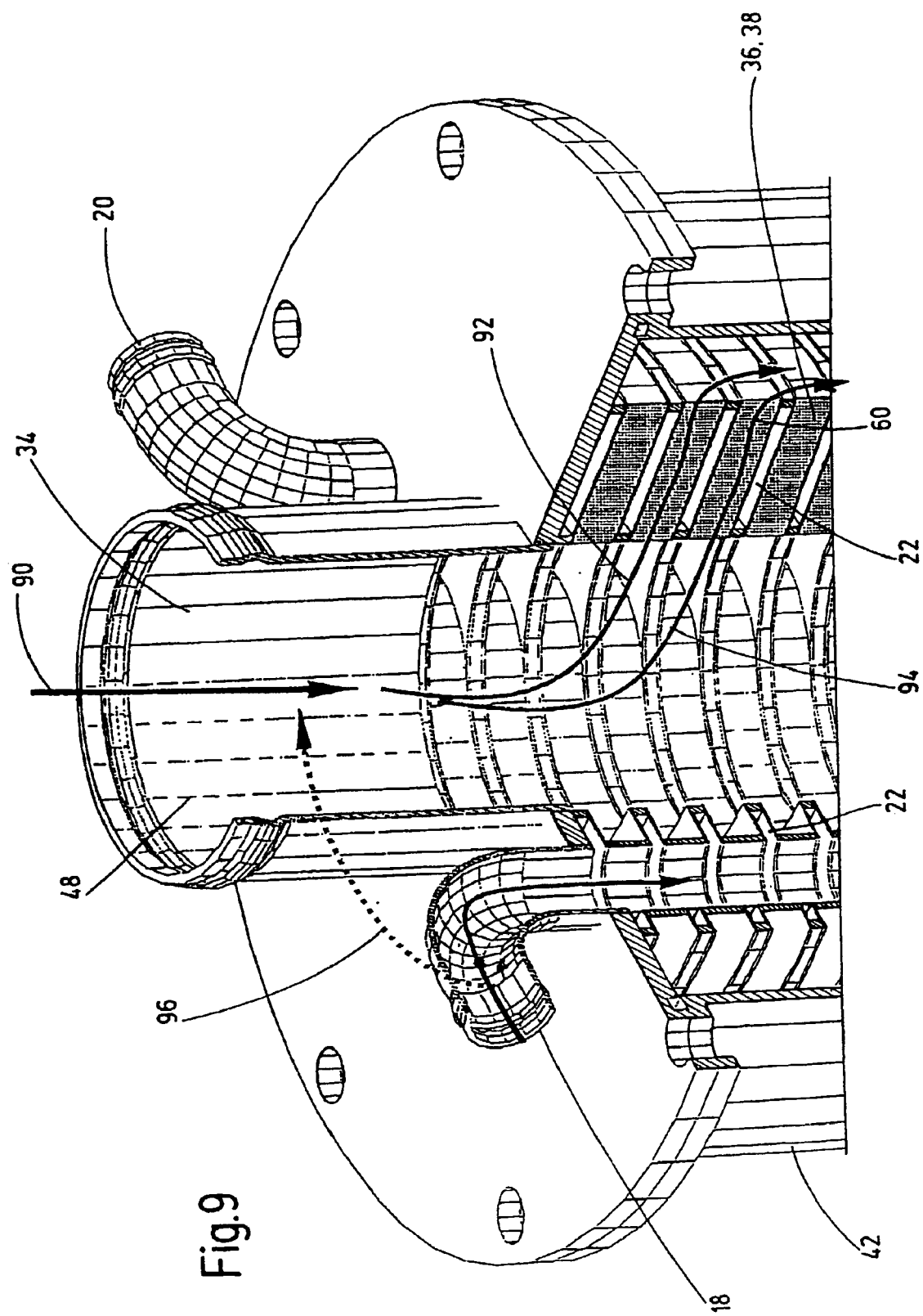
FIG. 9 shows an enlarged part of the cooler according to FIG. 8.

FIG. 9 shows an enlarged part of the cooler according to FIG. 8. Here, the individual flow directions are shown in more detail with the aid of the arrows. The arrow 90 identifies the flow direction of the inflowing air. The arrows 92, 94 identify the deflection of the air and its flow direction perpendicularly to the axis of the arrangement in the region 60. The arrow 96 identifies the flow of the cooling medium in the circumferential direction through the passages 22.

Figure 10:
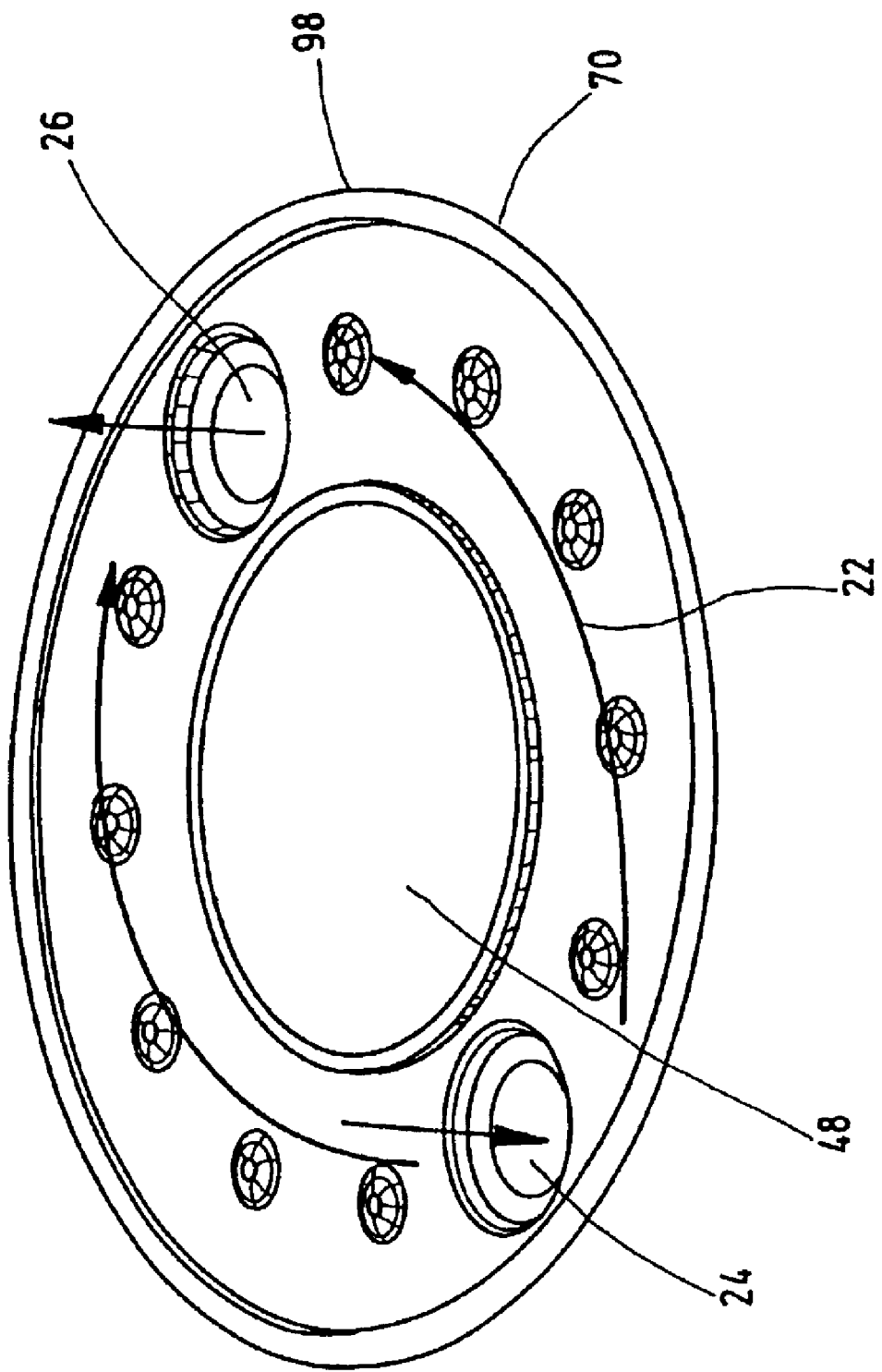
FIG. 10 is a perspective representation of a disk for use in a cooler according to FIG. 8 and FIG. 9.

FIG. 10 shows a perspective representation of a disk for use in a cooler according to FIGS. 8 and 9. The disk 70 has two openings 24, 26. Cooling medium flows through one opening 24 in the one direction and through the other opening 26 in the other direction. The radially outer boundary of the disk 70 is like the rim of a plate. If a disk of the same type of construction is placed the other way round onto the disk shown in FIG. 10, so that the rims 98 of the disks touch one another, the passage 22 is formed between the disks. Furthermore, if a further disk 70, in the same orientation as the first disk 70, is placed onto the disk 70 at the top, and so on, a stack of disks consisting of disk pairs is gradually formed, with the disks forming two axially running through-passages on account of the openings 24, 26. Cooling fins are placed between the disk pairs. These cooling fins bring about the air flow running perpendicularly to the axis of the arrangement.

Figure 11:
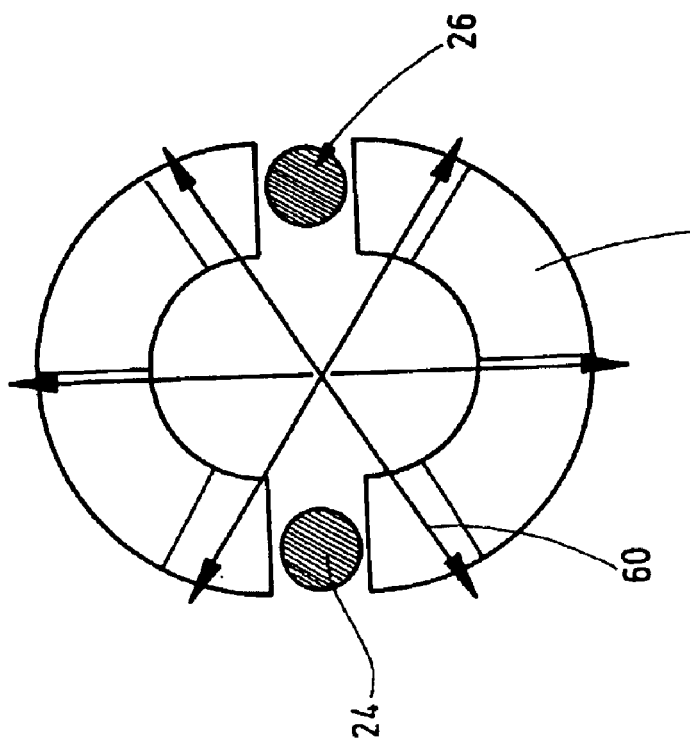
FIG. 11 is a plan view of a first cooling fin arrangement for use in a cooler according to FIGS. 8 and 9.

FIG. 11 shows a plan view of a first cooling fin arrangement for use in a cooler according to FIGS. 8 and 9. The two passages 24, 26 for the cooling medium are shown. The corrugated fins 32 placed on a radius ensure that a radial flow of the cooling air is possible. However, such an arrangement may be more difficult from the production point of view, since the arrangement of the corrugated fins 36 placed on a radius produces a stress in the corrugated fins. It is therefore necessary to reliably fasten the corrugated fins to the disks during assembly.

Figure 12:
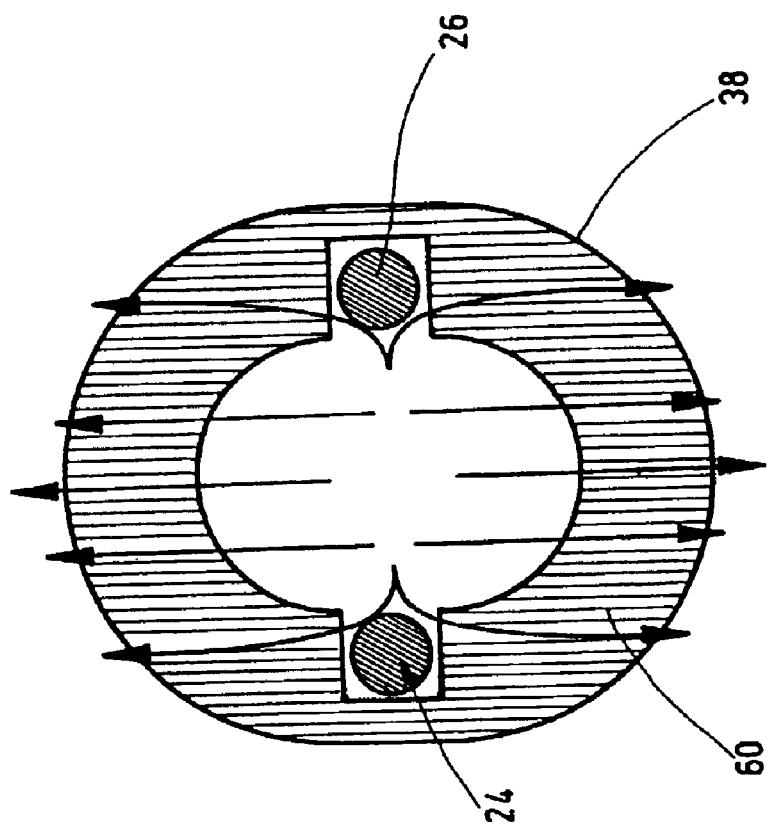
FIG. 12 is a plan view of a second cooling fin arrangement for use in a cooler according to FIGS. 8 and 9.

FIG. 12 shows a plan view of a second cooling fin arrangement for use in a cooler according to FIGS. 8 and 9. A simpler solution from the production point of view is shown here. Fin plates 38 are provided. However, this solution is fluidically less desirable, since the medium to be cooled does not flow through certain regions, for example, the regions on the outside relative to the passages 24, 26.

FIG. 13 shows a first example of a use for the coolers according to the invention. An engine 100, an oil sump 102 and an oil pump 104 are shown. In a first embodiment, a cooler according to the invention is arranged in the oil sump 102. In a further embodiment, a cooler according to the invention is similarly provided outside the oil sump.

Figure 14:
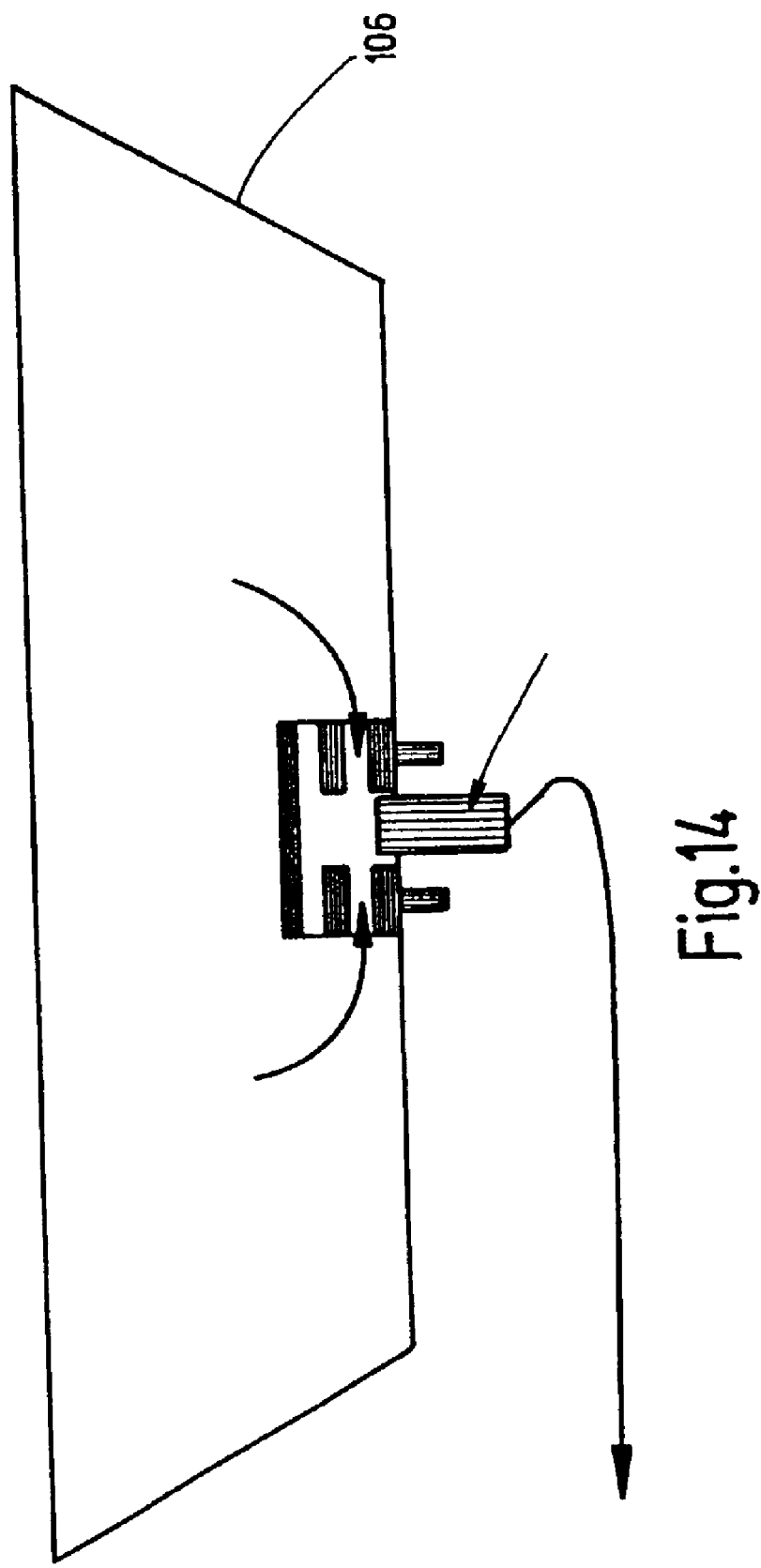
FIG. 14 is a schematic view showing a second example of use of coolers according to the invention.

FIG. 14 shows a second example of a use for the coolers according to the invention. A fuel tank 106 with an integrated, for example encapsulated, cooler is shown here.

Figure 15:
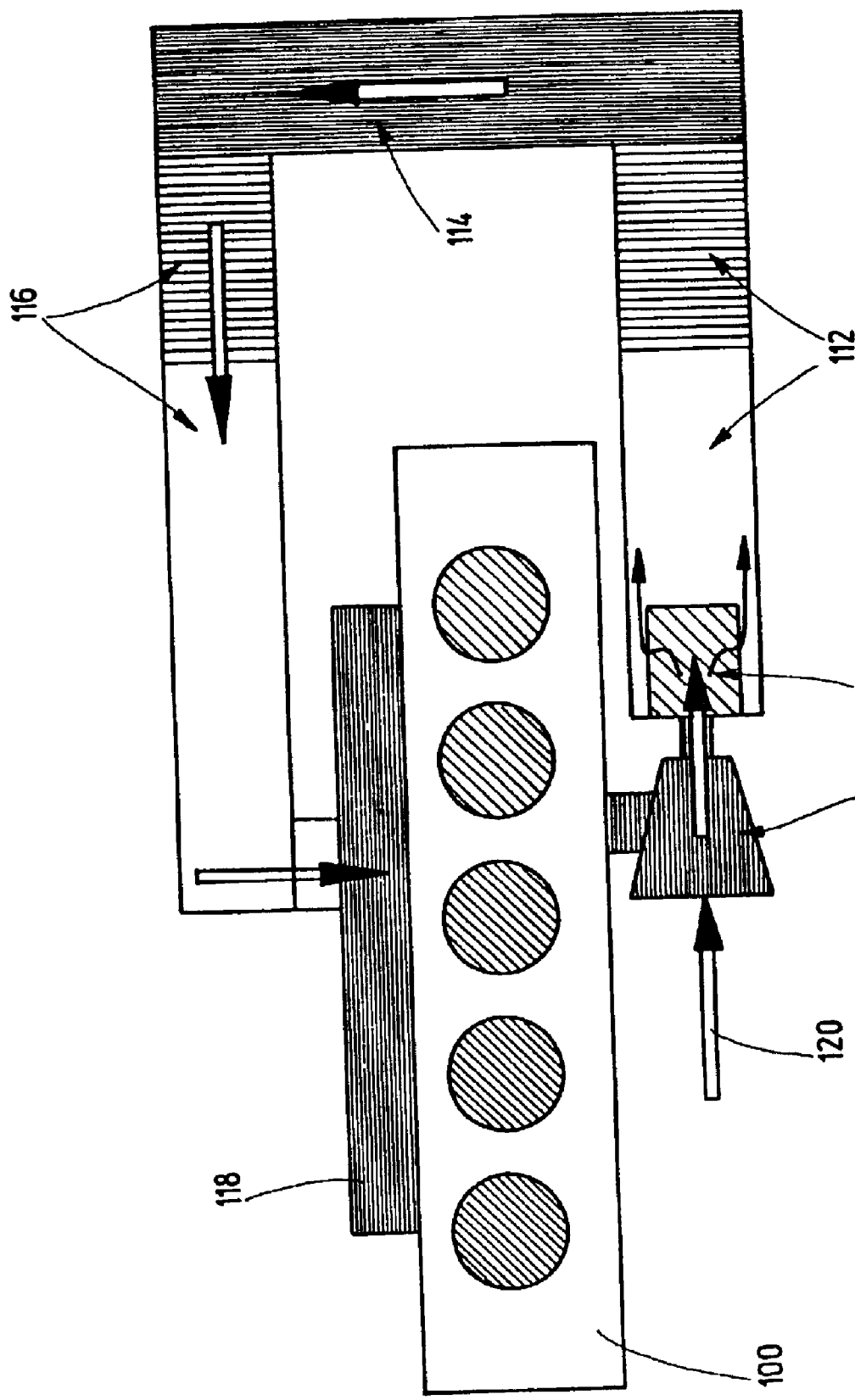
FIG. 15 is a schematic representation of a charge pre-cooling system with a cooler according to the invention.

FIG. 15 shows a schematic representation of a charge pre-cooling system having a cooler 110 according to the invention. The system comprises an engine 100, a supercharger 108, a cooler 110 according to the invention, a charge-air line 112, a charge-air/air cooler 114, a charge-air line 116 and an air manifold 118 for the entry of air into the engine 100. The air to be cooled or the cooled air is shown by arrows 120.

Figure 16:
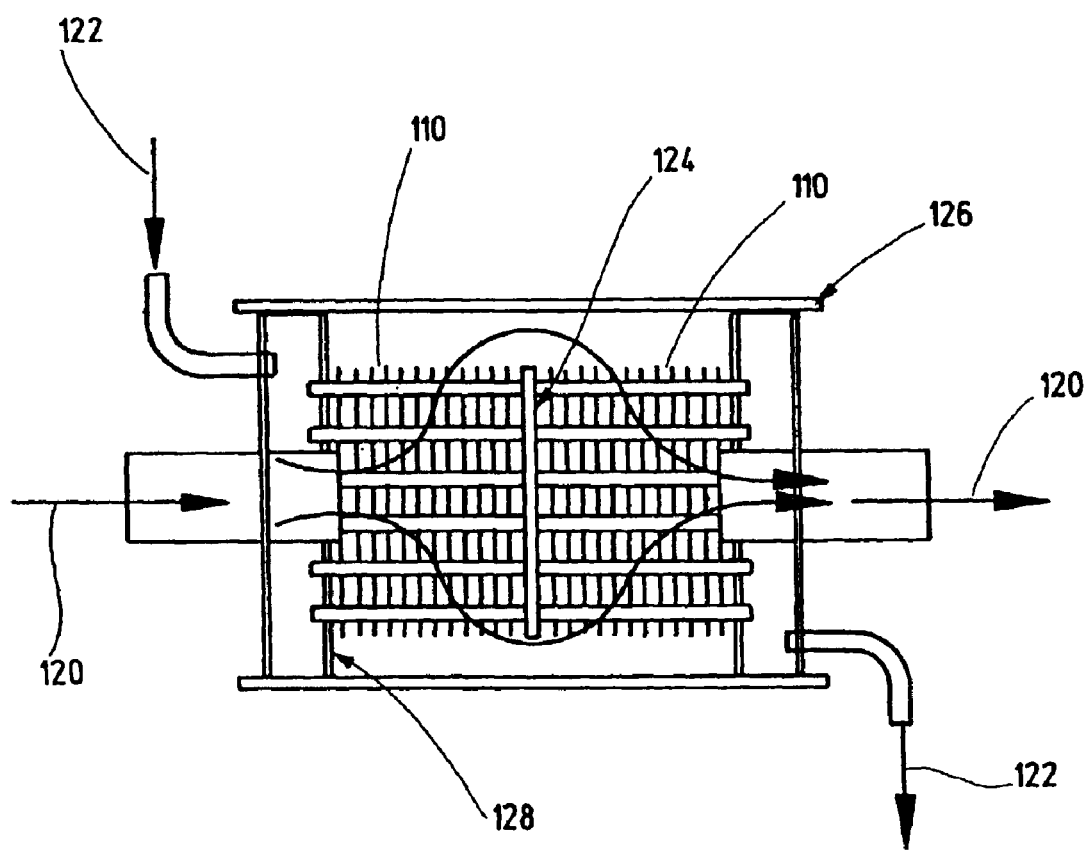
FIG. 16 is a schematic representation of a double cooler using coolers according to the invention.

FIG. 16 shows a schematic representation of a double cooler using coolers 110 according to the invention. The system consists of two coolers 110 which are separated from another by a separating plate 124. The double cooler is surrounded by a casing tube 126. A base and water tank 128 are provided inside the casing tube. The medium to be cooled or the cooled medium is designated by arrows 120. The cooling medium is designated by arrows 122.

The foregoing description of preferred embodiments of the invention has been presented for purposes of illustration and description only. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and that the claims encompass all embodiments of the invention, including the disclosed embodiments and their equivalents.

What is claimed is:

1. A cooler having
   a first passageway for directing a cooling medium,
   at least one second passageway for directing a medium to be cooled comprising a plurality of baffle plates, wherein the baffle plates each have a radially inner region shaped as a conical envelope and a radially outer region shaped as a conical envelope, and a region which runs essentially perpendicular to the axis of the cooler and which has openings for tubes to pass through extends between the radially inner region and the radially outer region, and
   an essentially axially symmetrical housing which at least partially surrounds the second passageway,
   wherein
   the at least one second passageway for directing the medium to be cooled is arranged in such a way that the medium to be cooled, in at least one first region, flows in an essentially axial direction, and the medium to be cooled, in at least one second region, flows in a direction having a radial component.

2. The cooler as claimed in claim 1, wherein the at least one second passageway is arranged such that the medium to be cooled, in a radially inner region, flows in an axial direction into the cooler, and the medium to be cooled flows out of a cooling region of the cooler in a direction having a radial component.

3. The cooler as claimed in claim 1, wherein the baffle plates having a radially inner aperture forming the first passageway for the medium to be cooled, and
   a plurality of tubes extending essentially in the axial direction for directing the cooling medium and passing through openings in the baffle plates, wherein flow paths are defined between the baffle plates for the medium to be cooled, these flow paths having a radial component.

4. The cooler as claimed in claim 1, wherein the baffle plates each have the shape of a conical envelope and enclose an angle of about 45° with the axis of the cooler.

5. The cooler as claimed in claim 1, wherein
   a plurality of essentially axially symmetrical disks are arranged in layers one above the other,
   the disks are arranged as disk pairs which form passageways, running in the circumferential direction, for the cooling medium, the disks have through-openings that define an axial passage through the disks arranged in layers one above the other, and cooling fins are arranged between the disk pairs and oriented so that the medium to be cooled flows through these cooling fins essentially perpendicularly to the axis of the cooler.

6. The cooler as claimed in claim 1, wherein the cooling fins comprise corrugated fins placed on a radius.

7. The cooler as claimed in claim 1, wherein the cooling fins comprise fin plates having essentially parallel fin flanks.

8. In an automotive engine assembly having a charge-air pre-cooler, the charge air cooler comprising a cooler as defined by claim 1.

9. In an engine assembly having an exhaust-gas cooler, the exhaust gas cooler comprising a cooler as defined by claim 1.

10. In an engine assembly having an oil cooler, the oil cooler comprising a cooler as defined by claim 1.

11. In a fuel tank assembly including a fuel cooler, the fuel cooler comprising a cooler as defined by claim 1.

12. A method of cooling a medium, in which a cooling medium and a medium to be cooled are directed in an essentially axially symmetrical housing which at least partially surrounds the second passageway, comprising:

directing the medium to be cooled, in at least one first region, in an essentially axial direction, and directing the medium to be cooled, in at least one second region, in a direction having a radial component, wherein the medium to be cooled is deflected from a flow direction which forms an angle of about 45° with the axial flow direction into a radial flow direction and is subsequently deflected into a flow direction which forms and angle of about 45° with the axial flow direction.

13. The method as claimed in claim 12, wherein the medium to be cooled is deflected from an essentially axial flow direction into a flow direction which forms an angle of about 45° with the axial flow direction.

14. The method as claimed in claim 12, wherein the medium to be cooled is deflected from an essentially axial flow direction into a radial flow direction.

* * * * *